(12) United States Patent
Goodwin et al.

(10) Patent No.: US 9,856,893 B2
(45) Date of Patent: Jan. 2, 2018

(54) EROSION-RESISTANT FLUID PRESSURE REDUCTION DEVICE

(71) Applicant: FISHER CONTROLS INTERNATIONAL LLC, Marshalltown, IA (US)

(72) Inventors: Justin Paul Goodwin, Marshalltown, IA (US); Shane M. Johnson, Ames, IA (US); Jonathan W. Richardson, Marshalltown, IA (US); Theodore Paul Geelhart, Conrad, IA (US); Nathan John Hamblin, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 333 days.

(21) Appl. No.: 14/591,396

(22) Filed: Jan. 7, 2015

(65) Prior Publication Data
US 2015/0198187 A1    Jul. 16, 2015

Related U.S. Application Data

(60) Provisional application No. 61/928,354, filed on Jan. 16, 2014.

(51) Int. Cl.
| *G01F 1/42* | (2006.01) |
| *F15D 1/02* | (2006.01) |
| *F17D 1/20* | (2006.01) |
| *F16L 55/027* | (2006.01) |

(52) U.S. Cl.
CPC ............... *F15D 1/025* (2013.01); *F17D 1/20* (2013.01); *F16L 55/02709* (2013.01)

(58) Field of Classification Search
CPC ............... F16L 55/027; F16L 55/02718; F16L 55/02709
USPC .............................................. 138/42, 44, 45
See application file for complete search history.

(56) References Cited

U.S. PATENT DOCUMENTS

| 2,501,593 | A | * | 3/1950 | Becker | ..................... F16L 55/00 138/44 |
| 2,661,768 | A | * | 12/1953 | Novak | ..................... F16L 1/11 138/44 |
| 2,687,147 | A | * | 8/1954 | Feichter | ................. D01D 4/022 138/44 |
| 3,126,917 | A | * | 3/1964 | Hodgemann et. al. | ............................. F16L 55/027 138/44 |
| 3,921,672 | A | * | 11/1975 | Arnold | .................... F16K 51/00 138/42 |

(Continued)

*Primary Examiner* — Patrick F Brinson
(74) *Attorney, Agent, or Firm* — Marshall, Gerstein & Borun LLP (57) ABSTRACT

A fluid pressure reduction device is provided. The fluid pressure reduction device includes a body and a diffuser. The body defines an inlet, an outlet, and a fluid passageway extending between the inlet and the outlet. The body is made of a first material having a first hardness. A seating area is defined within the body. The diffuser is removably coupled to the seating area and disposed within the fluid passageway of the body. The diffuser defines at least one flowpath for reducing a pressure of a fluid flowing through the fluid passageway. The diffuser includes a second material having a second hardness greater than the first hardness of the first material.

16 Claims, 5 Drawing Sheets

(56) References Cited

U.S. PATENT DOCUMENTS

| | | | | |
|---|---|---|---|---|
| 4,234,008 | A | * | 11/1980 | Cronfel ..................... F16T 1/34 137/182 |
| 4,644,974 | A | * | 2/1987 | Zingg ....................... B24C 5/04 138/40 |
| 4,735,263 | A | | 4/1988 | Andro et al. |
| 5,315,859 | A | * | 5/1994 | Schommer ................ E03C 1/08 138/44 |
| 7,487,800 | B2 | * | 2/2009 | Lammers .............. A61M 5/141 138/37 |
| 8,387,666 | B2 | | 3/2013 | Fagerlund et al. |
| 2004/0238780 | A1 | * | 12/2004 | Gethmann .............. F16K 1/422 251/359 |
| 2010/0319799 | A1 | | 12/2010 | McCarty |

\* cited by examiner

EROSION-RESISTANT FLUID PRESSURE REDUCTION DEVICE

FIELD OF THE DISCLOSURE

The present disclosure is directed to fluid pressure reduction devices and, more particularly, to an erosion-resistant, fixed fluid-pressure reduction device.

BACKGROUND

In process control systems, such as distributed or popular scalable process control systems commonly found in chemical, petroleum, power generation, or other industrial processes, it is often necessary to reduce the pressure of a fluid. In some cases, the pressure of the fluid must be reduced significantly. In cases requiring a relatively high pressure reduction, the pressure drop ratio, which is the change in pressure divided by the inlet pressure, may be quite high.

Generally speaking, pressure reduction typically leads to increased levels of unwanted noise and/or vibration. In applications with a relatively high pressure drop, these problems can be even more pronounced. In an attempt to prevent or at least reduce noise and vibration, process systems often use flow restriction devices to reduce the pressure drop ratio and also to reduce the fluid pressures. Flow restriction devices include adjustable flow restriction devices, such as flow control valves and fluid regulators, and fixed fluid restriction devices, such as diffusers, silencers, and other back pressure devices. Conventional adjustable flow restriction devices, while effective, can be costly and difficult to install and maintain. Meanwhile, conventional fixed fluid restriction devices, though generally cheaper and easier to install and maintain, are typically not very durable. Various industrial, building, safety, and/or other codes often require the use of specific materials at external pressure boundaries. Because fixed fluid restriction devices typically form a portion of the external pressure boundary, fixed fluid restriction devices are usually built to the same code standards as the adjacent or surrounding piping, and hence the devices are typically made of the same material as the adjacent or surrounding piping. These materials, however, tend to be highly susceptible to erosion attributable to the fluid flowing through the system. This is particularly true when a fixed fluid restriction device is employed in a steam application that utilizes very erosive "wet steam" (water vapor and water droplets). The "wet steam" can quickly erode the fixed fluid restriction device, such that the fixed fluid restriction device may potentially have a relatively short life span.

SUMMARY

In accordance with a first exemplary aspect, a fluid pressure reduction device, which is adapted to be disposed between a first pipe and a second pipe, includes a body, a seating area, and a diffuser. The body defines an inlet, an outlet, and a fluid passageway extending between the inlet and the outlet. The seating area is disposed within the body. The diffuser is disposed within the fluid passageway of the body and coupled to the seating area. The diffuser defines a plurality of flowpaths arranged for reducing a pressure of a fluid flowing through the fluid passageway. The diffuser includes an erosion-resistant material.

In accordance with a second exemplary aspect, a fluid pressure reduction device includes a body, a seating area, and a diffuser. The body defines an inlet, an outlet, and a fluid passageway extending between the inlet and the outlet. The body is made of a first material having a first hardness. The seating area is defined within the body. The diffuser is removably coupled to the seating area and disposed within the fluid passageway of the body. The diffuser defines at least one flowpath for reducing a pressure of a fluid flowing through the fluid passageway. The diffuser includes a second material having a second hardness, the second hardness being greater than the first hardness.

In further accordance with any one or more of the foregoing first or second exemplary aspects, a fluid pressure reduction device may include any one or more of the following further preferred forms.

In one preferred form, the diffuser includes an orifice plate defining the plurality of flowpaths.

In another preferred form, the diffuser includes a disk.

In another preferred form, the diffuser is removably coupled to the seating area.

In another preferred form, the diffuser includes a threaded outer surface and is removably coupled to a threaded portion of the seating area.

In another preferred form, the diffuser is coupled to the seating area by welds.

In another preferred form, the seating area of the body includes an inwardly extending rib portion configured to retain the diffuser. The rib portion can be disposed downstream of the diffuser.

In another preferred form, an exterior surface of the diffuser is formed of a hardened material.

In another preferred form, the diffuser is made of Alloy 6 or 440c.

In another preferred form, the body is made of a same material as the first and second pipes.

In another preferred form, the diffuser includes threads and is removably coupled to a threaded portion of an interior of the body, the threaded portion disposed adjacent to the seating area.

In another preferred form, the diffuser can be removed from the fluid passageway and replaced with another diffuser.

In another preferred form, the fluid pressure reduction device is adapted to be installed in a steam drain.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is directed to an erosion-resistant, fixed fluid pressure reduction or backpressure device adapted to be utilized in any number of different process control applications (e.g., vapor, gas, steam process control applications). More specifically, the fluid pressure reduction device is adapted to be disposed (e.g., installed) in or between fluid conveyors (e.g., pipes, vents, or ducts) in a process control application (e.g., a vapor, gas, steam process control application) involving large amounts of fluid (e.g., steam).

The fluid pressure reduction device disclosed herein generally includes at least two discrete or separate components, a body and a diffuser (e.g., a plate, a disk). The body serves to connect the fluid pressure reduction device to or between the fluid conveyors (e.g., pipes, vents, or ducts). The diffuser is disposed within a portion of the body and coupled to a seating area disposed within or defined by the body. The diffuser defines or includes one or more flowpaths for reducing a pressure of the fluid flowing through the fluid pressure reduction device. So configured, the body can be made of normal piping materials, which are code compliant but are not erosion-resistant. At the same time, the diffuser can, by being a separate component disposed within a portion of the body, be made of or include an erosion-resistant material (e.g., Alloy 6, 440C), rather than normal piping materials, such that the diffuser can be substantially resistant to erosion from fluid flowing through the pressure reduction device. As a result, the diffuser, and, more generally, the fluid pressure reduction device, can withstand erosive conditions for a prolonged period of time and, thus, can last significantly longer than conventional fluid pressure reduction devices.

In some examples, the diffuser can be removably coupled to (e.g., removably threaded, snapped, hooked, etc.) the seating area, such that a diffuser that is near or at the end of its life span can be easily removed and replaced without having to remove and replace the entire fluid pressure reduction device (i.e., without having to remove and replace the body of the fluid pressure reduction device). As such, the fluid pressure reduction device can be repaired at a significantly reduced cost.

Figure 1A:
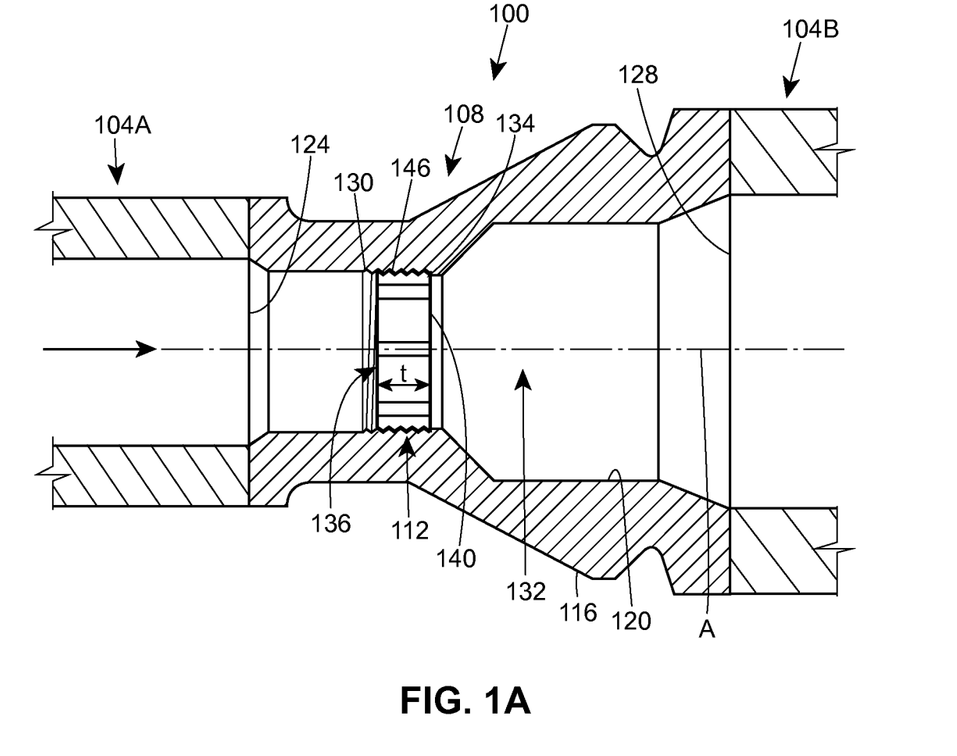
FIG. 1A is a cross-sectional view of a fluid pressure reduction device constructed in accordance with the principles of the present invention.
Figure 1B:
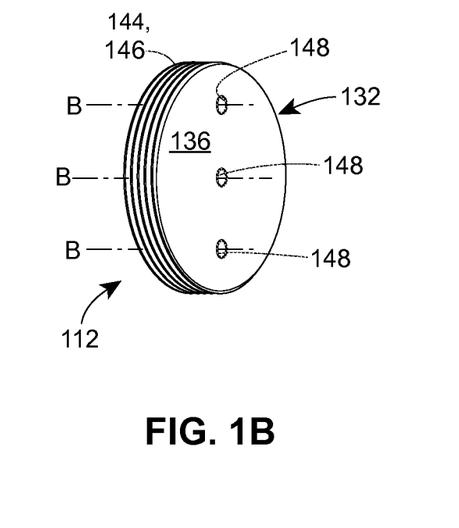
FIG. 1B is a front perspective view of a diffuser included in the fluid pressure reduction device of FIG. 1A.

FIGS. 1A and 1B depict a fluid pressure reduction device 100 constructed in accordance with the principles of the present invention. The fluid pressure reduction device 100 is disposed between first and second pipes 104A, 104B. In this example, the first pipe 104A is larger than the second pipe 104B, though this need not be the case (e.g., the first and second pipes 104A, 104B can have the same size). The pipes 104A, 104B are or form part of a steam drain that leads to a steam condenser (not shown, but downstream of the pipe 104B), but can, in other examples, be used in other process control applications (e.g., gas applications). The pipes 104A, 104B in this example thus carry "wet" steam, which includes water vapor and water droplets. These water droplets can, in some instances, be traveling at very high velocities. The pipes 104A, 104B may also, in some instances, carry foreign particulates traveling along or with the steam flowing therethrough. Although not illustrated herein, the fluid pressure reduction device 100 can be connected to the first and second pipes 104A, 104B using or via one or more flanges, hubs, BWE connections, SWE connections, or any other known connection means.

As shown in FIG. 1A, the fluid pressure reduction device 100 includes two discrete or separate components, a body 108 and a diffuser 112 removably disposed (e.g., installed, secured) within the body 108. In other examples, the fluid pressure reduction device 100 can include a plurality of diffusers 112 removably disposed within the body 108. For example, the device 100 can include two diffusers 112 disposed adjacent and offset from one another.

The body 108 is generally sized and shaped to facilitate the connection between the device 100 and the first and second pipes 104A, 104B. The body 108 has or defines a longitudinal axis A, an exterior surface 116, an interior surface 120, a first end or inlet 124, and a second end or outlet 128. In this example, the first end or inlet 124 is proximate to, and in fluid communication with, the first pipe 104A, while the second end or outlet 128 is proximate to, and in fluid communication with, the second pipe 104B; in other examples, this need not be the case (e.g., the first end 124 could instead be proximate to the second pipe 104B).

As shown in FIG. 1A, the interior surface 120 includes a threaded portion 130 configured to engage a corresponding threaded portion of the diffuser 112. The body 108 also includes a fluid passageway 132 defined by the interior surface 120, the inlet 124, and the outlet 128, and oriented along the longitudinal axis A. Finally, a seating area 134 is disposed within or defined by the body 108. In this example, the seating area 134 is defined by the interior surface 120, though the seating area 134 can be defined elsewhere and/or by some other component.

It will of course be appreciated that the shape and/or size of the body 108 can vary. More specifically, the shape and/or size of the components of the body 108, such as the exterior surface 116, the interior surface 120, the inlet 124, and the outlet 128, can vary based on, for example, (i) the shape and/or size of the pipes 104A, 104B, (ii) based on how the device 100 is to be connected to the body 108, and/or (iii) based on the desired flow requirements.

As briefly noted above, to comply with code governing material selection at external pressure boundaries, the pipes 104A, 104B must be made of one or more specific materials. The pipes 104A, 104B may, for example, need to be made of or from copper, steel (e.g., Carbon Steel or Stainless Steel), various alloys, some other material suitable for being used at an external pressure boundary, or combinations thereof. As described herein, the body 108 in this example is made of or from the same material as the pipes 104A, 104B. Thus, the body 108 can, for example, be made of or from copper, steel (e.g., Carbon steel or Stainless Steel), various alloys, some other material suitable for being used at an external pressure boundary, or combinations thereof. In other examples, the pipes 104A, 104B and the body 108 can be made of or from different materials and yet still comply with the coding governing material selection at external pressure boundaries.

As best shown in FIG. 1B, the diffuser 112 in this example has a disc-shaped body 132. The body 132 has a first side 136, a second side 140 (see FIG. 1A) opposite the first side 136, and a circumferential or perimeter edge 144. The perimeter edge 144 in this example has or includes threads 146. The diffuser 112 also includes a plurality of apertures 148 formed or defined in the body 132. In this example, the diffuser 112 includes three apertures 148 formed or defined in the body 132. The three apertures 148 each have a circular shape (when viewed in cross-section) and a constant diameter. Each aperture 148 has or defines a longitudinal axis B. The longitudinal axes B of the apertures 148 are, but need not be, parallel to one another. The apertures 148 are spaced apart from one another as shown in FIG. 1B and extend through the entire thickness t (see FIG. 1A) of the body 132 (i.e., the apertures 148 extend between the first side 136 and the second side 140 of the body 132). Each aperture 148 thus provides or serves as a flowpath or passageway for fluid flowing through the fluid pressure reduction device 100. As is known in the art, these flowpaths can reduce the pressure of the fluid flowing through the fluid pressure reduction device 100, and, in turn, reduce noise and vibration.

In other examples, the diffuser 112 can vary from the diffuser 112 illustrated herein. The diffuser 112 can, for example, take the form of an orifice plate, a differently sized and/or shaped disk, a surface, or other device configured to provide backpressure. The thickness t of the diffuser 112 can also vary. In some examples, the diameter, number, size, shape, and/or spacing of the apertures 148 can be varied. This can be done based on the desired flow requirements. For example, the apertures 148 can have a rectangular, triangular, hexagonal, irregular, or other cross-sectional shape. As another example, the diffuser 112 can include more or less apertures 148. In other examples, channels, slots, grooves, or apertures having non-constant or tapered diameters can be used instead of the apertures 148.

With reference back to FIG. 1A, the diffuser 112 can be disposed within the fluid passageway 132 and removably coupled to the seating area 134. This can be done before or after the body 108 has been connected to the pipes 104A, 104B. In any event, in this example, the diffuser 112 can be removably threaded to the interior surface 120 of the body 108. As shown in FIG. 1A, the threads 146 formed on the perimeter edge 144 of the diffuser 112 can engage corresponding threads of the threaded portion 130 of the interior surface 120 of the body 108. So disposed, the longitudinal axes B of the apertures 148 are parallel to the longitudinal axis A of the body 108. In other examples, one of more of these axes B can be angled relative to the longitudinal axis A.

In other examples, the diffuser 112 can be removably disposed within a different portion of the fluid passageway 132 and/or can be removably coupled to the seating area 134 of the body 108 in a different manner. For example, the diffuser 112 can be removably retained within the body 108 by a rib (e.g., the rib 410 illustrated in FIG. 4) extending inward from the interior surface 120 of the body 108.

When the device 100 is connected to the pipes 104A, 104B, and the diffuser 112 is disposed within the fluid passageway 132 and removably coupled to the seating area 134, fluid can flow through the device 100, particularly the diffuser 112, in a left-to-right flow direction (this can be reversed in other examples). The fluid flowing through the flowpaths of the diffuser 112 can be chemically erosive, can include foreign particulates, and/or can be traveling at a high rate of speed. When, as in the illustrated example, "wet" steam is flowing through these flowpaths, the "wet" steam can include water droplets traveling at a high-rate of speed and can also include foreign particulates.

The fluid restriction device 100 is, however, configured to substantially resist or withstand these erosive conditions. As the body 108 and the diffuser 112 are separate or discrete components, the diffuser 112 can be formed of or from a different material than the body 108. Moreover, because the diffuser 112 is disposed within a portion of the body 108, such that the diffuser 112 is not located at an external pressure boundary, the diffuser 112 need not be formed of a code-compliant material like the body 108. The diffuser 112 can thus be formed of a different material than the code-compliant, but erosive material used to make or form the body 108. The diffuser 112 can instead be at least partially formed of a material that is harder, and thus more erosion-resistant, than the body 108. In this example, the diffuser 112 is entirely made of or from 440c, Alloy 6, or some other suitable material. In other examples, the diffuser 112 can be partially made of or from one of these materials. Alternatively or additionally, the exterior surface of the diffuser 112, or portions thereof, can be treated (e.g., heat treated using a nitriding process) to create or form a hardened material.

As such, the diffuser 112 can substantially resist or withstand the erosive conditions described above for a prolonged period of time. At the very least, the diffuser 112 and, more generally, the fluid pressure reduction device 100 can substantially resist or withstand erosion for a longer period of time than it conventionally would (e.g., if the diffuser 112 was made of the same material as the body 108). It should be appreciated that this increases the working life span of the diffuser 112.

Moreover, because the diffuser 112 is removably coupled to the seating area 134 of the body 108, when the diffuser 112 is no longer functional (e.g., when it has finally eroded or otherwise worn out), the diffuser 112 can be removed from the seating area 134 and the interior fluid passageway 132 of the body 108. In turn, the diffuser 112 can be replaced with another (e.g., new) diffuser 112, which can be installed in a similar manner. In other words, the diffuser 112 can be removed and replaced without having to replace the entire fluid restriction device 100 (e.g., without having to remove and replace the body 108). It should be appreciated that the cost of replacing the diffuser 112 is significantly less than the cost of replacing the entire fluid restriction device 100.

Figure 2A:
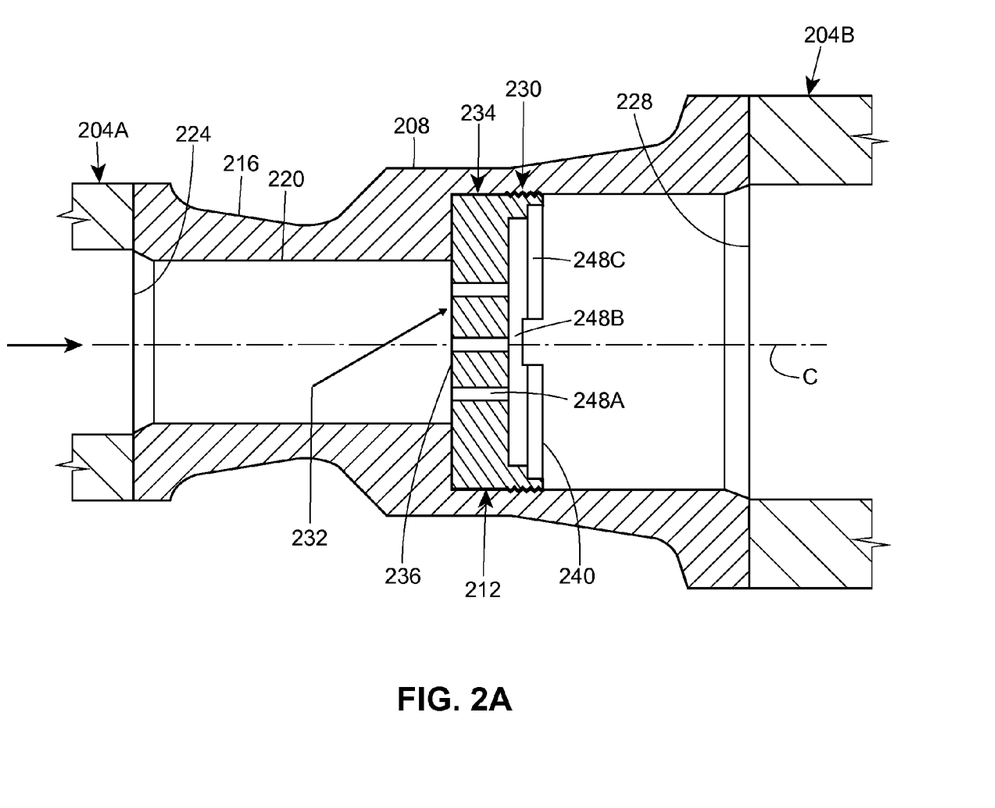
FIG. 2A is a cross-sectional view of a second example of a fluid pressure reduction device constructed in accordance with the principles of the present invention.
Figure 2B:
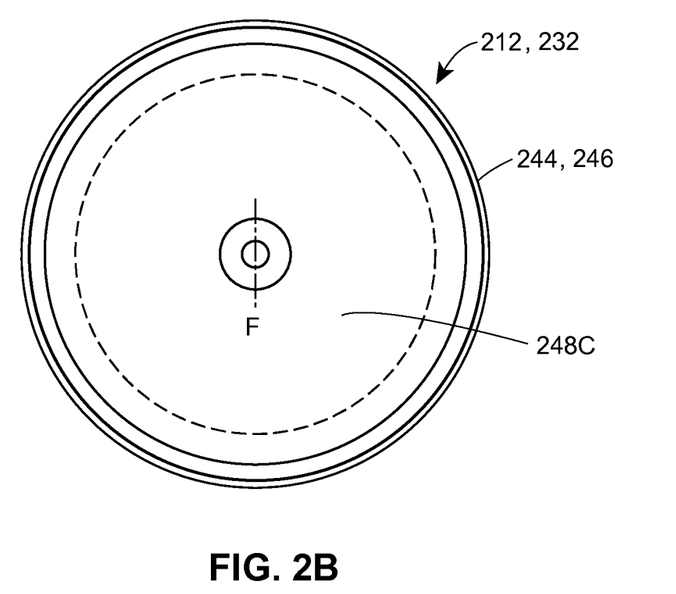
FIG. 2B is a front plan view of a diffuser of the fluid pressure reduction device of FIG. 2A.
Figure 2C:
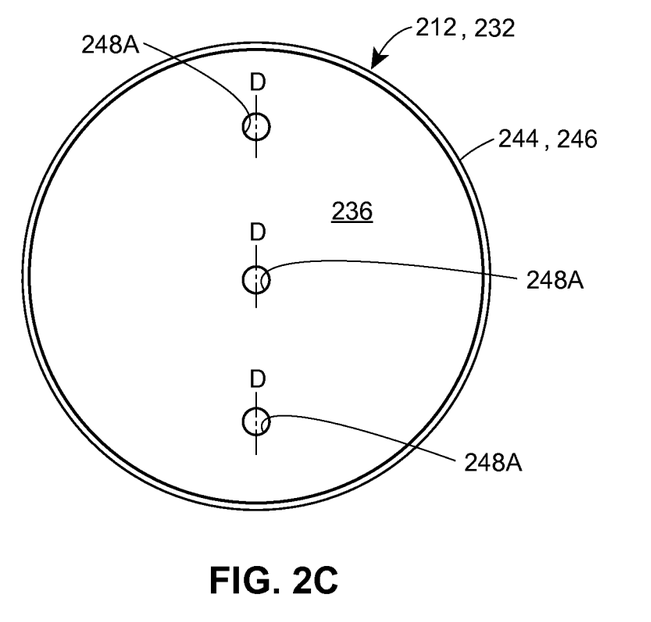
FIG. 2C is a rear plan view of the diffuser of the fluid pressure reduction device of FIG. 2A.

FIGS. 2A-2C depict another example of a fluid pressure reduction device 200 constructed in accordance with the principles of the present invention. Like the device 100, the fluid pressure reduction device 200 is disposed between first and second pipes 204A, 204B, which are essentially identical to the pipes 104A, 104B described above. Although not illustrated herein, the fluid pressure reduction device 200 can be connected to the first and second pipes 204A, 204B using or via one or more flanges, hubs, BWE connections, SWE connections, or any other known connection means.

As shown in FIG. 2A, the fluid pressure reduction device 200 includes two discrete or separate components, a body 208 and a diffuser 212 removably disposed (e.g., installed, secured) within the body 208. In other examples, the fluid pressure reduction device 200 can include a plurality of diffusers 212 removably disposed within the body 208. For example, the device 200 can include three diffusers 212 disposed adjacent and offset from one another.

The body 208 is similar to, but has a slightly different shape than, the body 108. The body 208 is generally sized and shaped to facilitate the connection between the device 200 and the first and second pipes 204A, 204B. The body 208 has or defines a longitudinal axis C, an exterior surface 216, an interior surface 220, a first end or inlet 224, and a second end or outlet 228. In this example, the first end or inlet 224 is proximate to, and in fluid communication with, the first pipe 204A, while the second end or outlet 228 is proximate to, and in fluid communication with, the second pipe 204B; in other examples, this need not be the case (e.g., the first end 224 could instead be proximate to the second pipe 204B).

As shown in FIG. 2A, the interior surface 220 includes a threaded portion 230 configured to engage a corresponding threaded portion of the diffuser 212. As seen when comparing FIGS. 1A and 2A, the threaded portion 230 is positioned further downstream than the threaded portion 130. The body 208 also includes a fluid passageway 232 defined by the interior surface 220, the inlet 224, and the outlet 228 and oriented along the longitudinal axis C. Finally, a seating area 234 is defined by the interior surface 220, though the seating area 234 can be defined elsewhere and/or by some other component.

It will of course be appreciated that the shape and/or size of the body 208 can vary from the body 208 illustrated herein. More specifically, the shape and/or size of the components of the body 208, such as the exterior surface 216, the interior surface 220, the inlet 224, and the outlet 228, can vary based on, for example, (i) the shape and/or size of the pipes 204A, 204B, (ii) based on how the device 200 is to be connected to the body 208, and/or (iii) based on the desired flow requirements.

Like the body 108, the body 208 in this example is made of or from the same material as the pipes 204A, 204B. Thus, the body 208 can, for example, be made of or from copper, steel (e.g., Carbon steel or Stainless Steel), various alloys, some other material suitable for being used at an external pressure boundary, or combinations thereof. In other examples, the pipes 204A, 204B and the body 208 can be made of or from different materials and yet still comply with the coding governing material selection at external pressure boundaries.

Unlike the diffuser 112, the diffuser 212 illustrated in FIGS. 2A-2C is an orifice plate. The orifice plate has a body 232. The body 232 has a first side 236, a second side 240 opposite the first side 236, and a circumferential or perimeter edge 244. In this example, a portion of the perimeter edge 244 has or includes threads 246. Like the diffuser 112, the orifice plate 212 includes a plurality of apertures 248. However, unlike the diffuser 112, which includes three identical apertures 148 that define one flow stage, the orifice plate 212 includes a plurality of differently sized apertures 248, three apertures 248A, one aperture 248B, and one aperture 248C, which define three different flow stages, respectively. Fluid flowing through the orifice plate 212 will thus have different flow characteristics than fluid flowing through the diffuser 112. Each aperture 248A provides or serves as a flowpath or passageway for a first stage of fluid flow through the fluid pressure reduction device 200. The three apertures 248A each have a circular shape (in cross-section), a constant diameter, and a longitudinal axis D. The longitudinal axes D of the three apertures 248A are, but need not be, parallel to one another. The aperture 248B, which has a longitudinal axis E and a larger diameter than each aperture 248A, provides or serves as a flowpath or passageway for a second stage of fluid flow through the fluid pressure reduction device 200. The aperture 248C, which has a longitudinal axis F, provides or serves as a flowpath or passageway for a third stage of fluid flow through the fluid pressure reduction device 200. As is known in the art, these flowpaths can reduce the pressure of the fluid flowing through the fluid pressure reduction device 200, and, in turn, reduce noise and vibration, albeit in a different way than the diffuser 112.

In other examples, the diffuser 212 can vary from the diffuser 212 illustrated in FIGS. 2A-2C. The diffuser 212 can, for example, take the form of a disk, a different orifice plate, a surface, or other device configured to provide backpressure. The diameter and/or thickness t of the diffuser 212 can also vary. The arrangement, number, size, shape, and/or spacing of the apertures 248A, 248B, 248C can, for example, be varied depending on the desired flow requirements. The diffuser 212 can additional, fewer, or different apertures 248. For example, the apertures 248A, 248B, and/or 248C can have a rectangular, triangular, hexagonal, irregular, or other cross-sectional shape. In other examples, channels, slots, grooves, or apertures having non-constant or tapered diameters can be used instead of or in addition to the apertures 248A, 248B, and/or 248C.

With reference back to FIG. 2A, the diffuser 212 can be disposed within the fluid passageway 232 and removably coupled to the seating area 234. This can be done before or after the body 208 has been connected to the pipes 104A, 104B. In any event, in this example, the diffuser 212 can be removably threaded to the interior surface 220 of the body 208. As shown in FIG. 2A, the threaded portion 246 of the diffuser 212 can engage corresponding threads of the threaded portion 230 of the interior surface 220 of the body 208. As shown in FIG. 2A, the longitudinal axes D of the two outer apertures 248A are parallel to the longitudinal axis C of the body 208, and the longitudinal axis D of the middle aperture 248A and the longitudinal axes E and F of the apertures 248B, 248C, respectively, are co-axial with the longitudinal axis C of the body 208. In other examples, one or more of the axes D, E, and F can be arranged differently (e.g., can be angled) relative to the longitudinal axis C.

In other examples, the diffuser 212 can be removably disposed within a different portion of the fluid passageway 232 and/or can be removably coupled to the seating area 234 of the body 208 in a different manner. For example, the diffuser 212 can be removably retained within the body 208 by a rib (e.g., the rib 410 illustrated in FIG. 4) extending inward from the interior surface 220 of the body 208.

When the device 200 is connected to the pipes 204A, 204B, and the diffuser 212 is disposed within the fluid passageway 232 and removably coupled to the seating area 234, fluid can flow through the device 200, particularly the diffuser 212. As described above, the fluid flowing through the flowpaths defined by the diffuser 212 can be chemically erosive, can include foreign particulates, and/or can be traveling at a high rate of speed.

Much like the device 100, the fluid pressure restriction device 200 is configured to substantially resist or withstand these erosive conditions. For similar reasons as described above in connection with the device 100, the diffuser 212 can be formed of a different material than the code-compliant, but erosive material used to make or form the body 208. The diffuser 212 can instead be at least partially formed of a material that is harder, and thus more erosion-resistant, than the body 208. In this example, the exterior surface of the diffuser 212 has been treated (e.g., heat treated using a nitriding process) to create or form a hardened orifice plate. It will be appreciated that the diffuser 212 can alternatively or additionally be made of or from 440c, Alloy 6, or some other suitable material.

As such, diffuser 212 can, like the diffuser 112, substantially resist erosion from the fluid flowing through the fluid pressure restriction device 200. The diffuser 212 can substantially resist erosion for a longer period of time than it conventionally would (e.g., if the diffuser 212 was made of the same material as the body 208), thereby increasing the working life span of the diffuser 212. Moreover, when the diffuser 212 is no longer functional (e.g., when it has eroded or otherwise worn out), the diffuser 212 can be removed from the seating area 234 and the fluid passageway 232. In turn, the diffuser 212 can be replaced with another (e.g., new) diffuser 212, which can be installed in a similar manner. In other words, the diffuser 212 can be removed and replaced without having to replace the entire fluid restriction device 200 (e.g., without having to replace the body 108). It should be appreciated that the cost of replacing the diffuser 212 is significantly less than the cost of replacing the entire fluid restriction device 200.

Figure 3:
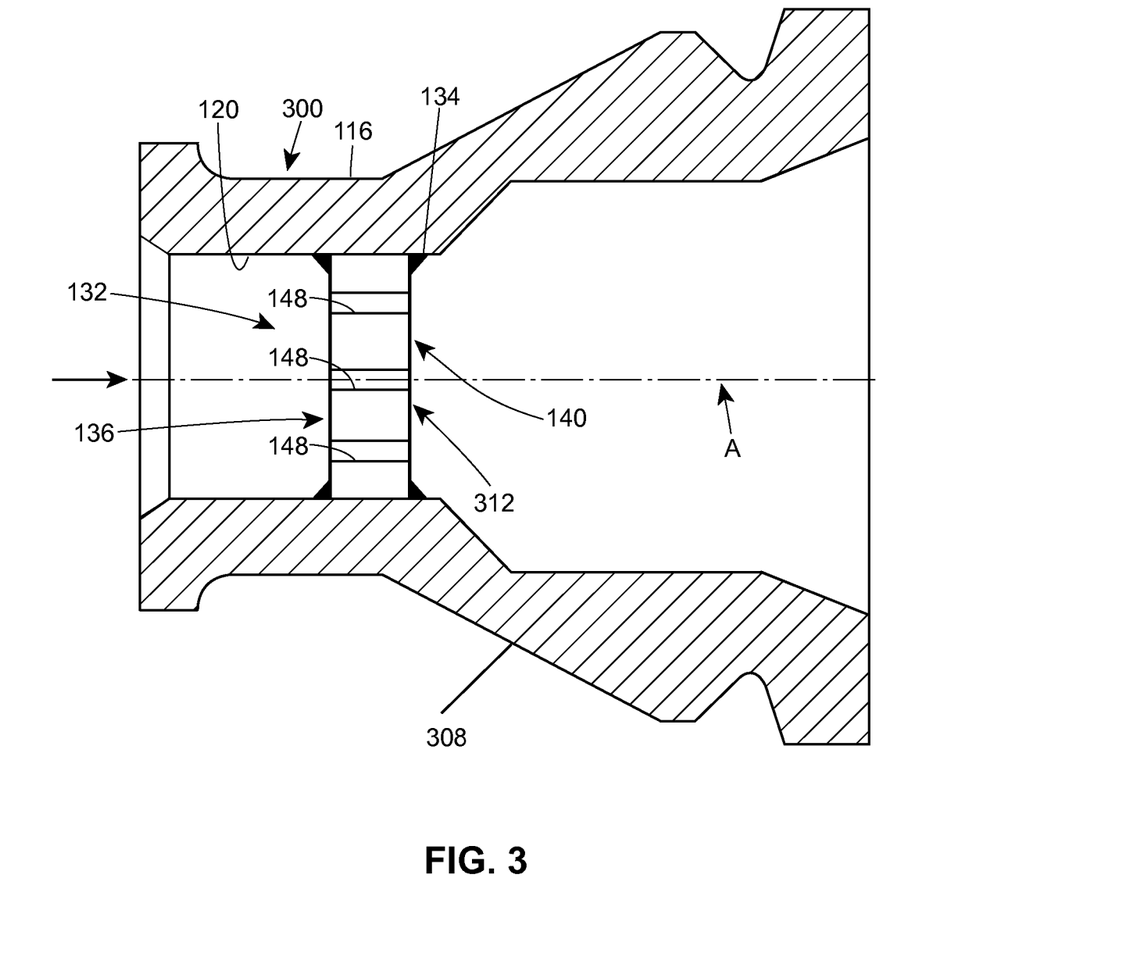
FIG. 3 is a cross-sectional view of a third example of a fluid pressure reduction device constructed in accordance with the principles of the present invention.

FIG. 3 illustrates a cross-sectional view of another example of a fluid pressure reduction device 300 constructed in accordance with the principles of the present invention. The fluid pressure reduction device 300 is very similar to the fluid pressure reduction device 100. The fluid pressure reduction device 300 can be disposed between and connected to the pipes 104A, 104B, as the device 100 is, or can be disposed between and connected to other fluid conveyors (e.g., the pipes 204A, 204B, conveyors in other process control applications).

The fluid pressure reduction device 300 includes a body 308 and a diffuser 312 disposed within an interior portion of the body 308. The body 308 and the diffuser 312 are essentially identical to the body 108 and the diffuser 112, respectively, described above. Common components are referenced with the same reference numerals.

As described above, the interior surface 120 of the body 108 includes a threaded portion 130. Unlike the body 108, however, the body 308 does not have such a threaded portion. Unlike the diffuser 112, the diffuser 312 does not have threads. Thus, the body 308 and the diffuser 312 cannot be removably threaded to one another. Instead, as shown in FIG. 3, the diffuser 312 can be fixedly coupled to the seating area 134 within the fluid passageway 132 of the body 308. In this example, the diffuser 312 is welded to the seating area 134 of the body 308. In other examples, the diffuser 312 can be attached or adhered to the seating area 134 in some other way and/or in a different location. The diffuser 312 can, for example, be glued to the seating area 134 of the body 308.

As such, the diffuser 312 is retained within the body 308 in a more secure manner than the diffuser 112 is retained within the body 108. In turn, the fluid restriction device 300, particularly the diffuser 312, is, in the same way as the devices 100, 200, configured to substantially resist or withstand the erosive conditions noted above for a prolonged period of time.

Figure 4:
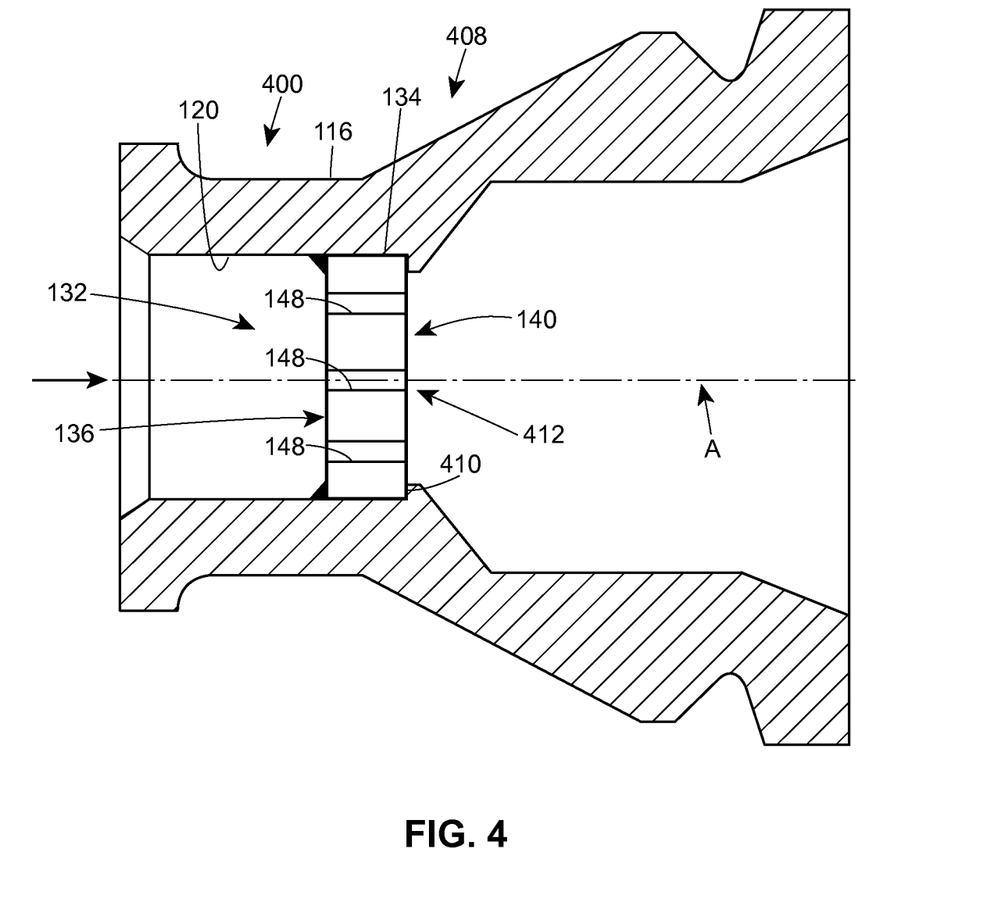
FIG. 4 is a cross-sectional view of a fourth example of a fluid pressure reduction device constructed in accordance with the principles of the present invention.

FIG. 4 illustrates a cross-sectional view of another example of a fluid pressure reduction device 400 constructed in accordance with the principles of the present invention. The fluid pressure reduction device 400 is essentially identical to the fluid pressure reduction device 300. The fluid pressure reduction device 400 can be disposed between and connected to the pipes 104A, 104B, as the device 100 is, or can be disposed between and connected to other fluid conveyors (e.g., the pipes 204A, 204B, conveyors in other process control applications).

The fluid pressure reduction device 400 includes a body 408 and a diffuser 412 disposed within and coupled to an interior portion of the body 408. The body 408 and the diffuser 412 are essentially identical to the body 308 and the diffuser 312, respectively, described above. Common components are referenced with the same reference numerals. As shown in FIG. 4, the body 408 in this example includes a rib 410. The rib 410 extends or protrudes inward from the interior surface 120 of the body 408 and into the fluid passageway 132 at a position adjacent the seating surface 134.

Like the diffuser 312, the diffuser 412 is disposed within the fluid passageway 132 and fixedly coupled to the seating area 134. In this example, the diffuser 412 is welded to the seating area 134 of the body 408 at a position upstream and adjacent the rib 410. In turn, the rib 410 is configured to help retain the diffuser 412 within the body 408. To this end, the rib 410 contacts and retains a corresponding portion of the second side 140 of the diffuser 412.

As such, the diffuser 412 is retained within the body 408 in an even more secure manner than the diffuser 312 is retained within the body 308. In turn, the fluid restriction device 400, particularly the diffuser 412, is configured to substantially resist or withstand the erosive conditions noted above for a prolonged period of time.

Although not explicitly illustrated herein, in some examples, any of the fluid pressure reduction devices 100, 200, 300, and 400 described herein can include one or more measurement devices for measuring fluid flow characteristics, which can, in turn, be indicative of the health and effectiveness of the diffuser (e.g., the diffuser 112, 212, 312, 412) of any one of the devices 100, 200, 300, 400.

The measurement devices can be disposed anywhere in the body of any one of these devices 100, 200, 300, 400, and/or can be disposed within or on the diffuser of any one of these devices 100, 200, 300, 400. The one or more measurement devices can, for example, include flowmeters configured to measure the flow rate of the fluid, devices (e.g., accelerometers) configured to measure vibration caused by the fluid flow, devices (e.g., sound meters) configured to measure noise caused by the fluid flow, devices (e.g., rotameters) configured to measure the pressure drop or reduction.

As noted above, fluid flow characteristics like noise, flow rate, vibration, and pressure drop can indicate or illustrate how well the diffuser is functioning and the health (e.g., the level of degradation) of the diffuser. For example, diffusers subject to higher levels of flow rate are likely to degrade faster. As another example, greater levels of noise and/or vibration may indicate that the diffuser is not functioning properly or as effectively as it should.

As such, the measurement devices can transmit the measured flow characteristics to a process controller, one or more workstations, or some other process control device. The process controller, or a user thereof, can, in turn, assess the health and integrity of the diffuser, or, more generally, the fluid flow restriction device. Such information can help the user identify when the fluid flow restriction device, particularly the diffuser, needs to be replaced or will need to be replaced, without forcing the user to dissemble and inspect the fluid flow restriction device.

Based on the foregoing description, it should be appreciated that the fluid pressure reduction devices described herein can substantially resist or withstand erosive conditions for a prolonged period of time. The fluid pressure reduction device thus has a significantly longer working lifespan than conventional fluid pressure reduction devices.

The invention claimed is:

1. A fluid pressure reduction device adapted to be disposed between a first pipe and a second pipe, the fluid pressure reduction device comprising:
   a body defining an inlet, an outlet, and a fluid passageway extending between the inlet and the outlet;
   a seating area defined within the body;
   a diffuser disposed within the fluid passageway of the body and coupled to the seating area, the diffuser defining a plurality of flowpaths arranged for reducing a pressure of a fluid flowing through the fluid passageway; and
   wherein the diffuser comprises an erosion-resistant, orifice plate or disk defining the plurality of flowpaths and, made of Alloy 6 or 440c.

2. The fluid pressure reduction device of claim 1, wherein the diffuser is removably coupled to the seating area.

3. The fluid pressure reduction device of claim 2, wherein the diffuser includes a threaded outer surface and is removably coupled to a threaded portion of the seating area.

4. The fluid pressure reduction device of claim 1, wherein the diffuser is coupled to the seating area by welds.

5. The fluid pressure reduction device of claim 2, wherein the seating area of the body includes an inwardly extending rib portion configured to retain the diffuser.

6. The fluid pressure reduction device of claim 5, wherein the rib portion is downstream of the diffuser.

7. The fluid pressure reduction device of claim 1, wherein an exterior surface of the diffuser is formed of a hardened material.

8. The fluid pressure reduction device of claim 1, wherein the body is made of a same material as the first and second pipes.

9. The fluid pressure reduction device of claim 1,
wherein the body is made of a first material having a first hardness,
wherein the diffuser is a one-piece diffuser, wherein the erosion-resistant, metallic material has a second hardness; and
wherein the second hardness is greater than the first hardness.

10. The fluid pressure reduction device of claim 9, wherein the one-piece diffuser can be removed from the fluid passageway and replaced with another one-piece diffuser.

11. A fluid pressure reduction device adapted to be disposed between a first pipe and a second pipe, the fluid pressure reduction device comprising:
a body defining an inlet, an outlet, and a fluid passageway extending between the inlet and the outlet;
a seating area defined within the body;
a diffuser disposed within the fluid passageway of the body and coupled to the seating area, the diffuser defining a plurality of flowpaths arranged for reducing a pressure of a fluid flowing through the fluid passageway; and
wherein the diffuser comprises an erosion-resistant, metallic material, and
wherein the diffuser is coupled to the seating area by welds.

12. The fluid pressure reduction device of claim 11, wherein the diffuser comprises an orifice plate defining the plurality of flowpaths.

13. The fluid pressure reduction device of claim 11, wherein the diffuser comprises a disk.

14. A fluid pressure reduction device adapted to be disposed between a first pipe and a second pipe, the fluid pressure reduction device comprising:
a body defining an inlet, an outlet, and a fluid passageway extending between the inlet and the outlet;
a seating area defined within the body;
a diffuser disposed within the fluid passageway of the body and coupled to the seating area, the diffuser defining a plurality of flowpaths arranged for reducing a pressure of a fluid flowing through the fluid passageway; and
wherein the diffuser comprises an orifice plate or disk defining the plurality of flowpaths and formed of an erosion-resistant, metallic material,
wherein the diffuser is removably coupled to the seating area, and
wherein the seating area of the body includes an inwardly extending rib portion configured to retain the diffuser.

15. The fluid pressure reduction device of claim 14, wherein the rib portion is downstream of the diffuser.

16. The fluid pressure reduction device of claim 14, wherein the diffuser includes a threaded outer surface and is removably coupled to a threaded portion of the seating area.

* * * * *

UNITED STATES PATENT AND TRADEMARK OFFICE
CERTIFICATE OF CORRECTION

PATENT NO. : 9,856,893 B2
APPLICATION NO. : 14/591396
DATED : January 2, 2018
INVENTOR(S) : Justin Paul Goodwin et al.

It is certified that error appears in the above-identified patent and that said Letters Patent is hereby corrected as shown below:

In the Specification

At Column 1, Line 12, "or popular" should be -- or --.

In the Claims

At Column 10, Line 66, "and," should be -- and --.

Signed and Sealed this
Eighteenth Day of June, 2019

Andrei Iancu
*Director of the United States Patent and Trademark Office*